United States Patent
Franke et al.

(12)

(10) Patent No.: US 6,264,289 B1
(45) Date of Patent: Jul. 24, 2001

(54) VEHICLE BRAKING SYSTEM

(75) Inventors: Torsten Franke, Burgdorf; Klaus Gläbe, Hannover; Bodo Klein, Barsinghausen; Ralf Koschorek, Ronnenberg; Erwin Petersen, Wunstorf; Thomas Reich, Hannover; Christian Wiehen, Burgwedel, all of (DE)

(73) Assignee: Wabco GmbH, Hannover (DE)

( * ) Notice: Subject to any disclaimer, the term of this patent is extended or adjusted under 35 U.S.C. 154(b) by 0 days.

(21) Appl. No.: 09/208,298

(22) Filed: Dec. 9, 1998

(30) Foreign Application Priority Data

Dec. 13, 1997 (DE) .................................. 197 55 431

(51) Int. Cl.[7] .................... B60T 8/00; B60T 8/26; B60T 13/66; B60T 8/60; B60K 41/20
(52) U.S. Cl. .................... 303/20; 188/158; 303/3; 303/199
(58) Field of Search ................... 303/20, 15, 3, 303/199, 122–122.08, 146, 141, 140, 155, 113.4; 188/158–165; 701/70, 71

(56) References Cited

U.S. PATENT DOCUMENTS

| | | |
|---|---|---|
| 5,145,239 | 9/1992 | Meise et al. . |
| 5,255,962 | 10/1993 | Neuhaus et al. . |
| 5,681,992 | 10/1997 | Klein et al. . |
| 5,752,748 * | 5/1998 | Schramm et al. ............. 303/122.03 |
| 5,810,454 * | 9/1998 | Prinzler et al. ................... 303/20 |

FOREIGN PATENT DOCUMENTS

| | | |
|---|---|---|
| 3916642 | 11/1990 | (DE) . |
| 4016463 | 9/1991 | (DE) . |
| 42 28 893 A1 | 3/1994 | (DE) . |
| 4228893 | 3/1994 | (DE) . |
| 195 21 175 | 7/1996 | (DE) . |
| 1950933 | 9/1996 | (DE) . |
| 19511161 | 10/1996 | (DE) . |
| 19512766 | 10/1996 | (DE) . |
| 197 06 475 | 8/1997 | (DE) . |
| 197 07 059 | 8/1997 | (DE) . |
| 19631856 | 2/1998 | (DE) . |
| 19755431 * | 6/1999 | (DE) . |
| 0467112 | 6/1991 | (EP) . |
| 0922618 * | 6/1999 | (EP) . |

OTHER PUBLICATIONS

Debes, et al., "Dynamische Stabilitäts Control DSC der Baureihe 7 von BMW—Teil 1" ATZ Automobiltechnische Zeitschrift 99 (1997), pp. 134–140.

Leffler, "ABS–integrierte Schulpfregelsysteme Aufwandsabschätzung und Leistungsvergleich durch den Fahrzeughersteller" ATZ Automobiltechnische Zeitschrift 93 (1001), pp. 4–10.

Müller, et al. "Das neue Fahrsicherheitssystem Electronic Stability Program von Mercedes Benz", ATZ Automobiltechnische Zeitschrift 96 (1994), pp. 1–8.

"Dynamische Stabilitaets Control DSC Der Baureihe 7 von BMV—Teil 1," Von Michael Debes et al., *ATZ Automobiltechnische Zeitschrift 99*, Bd. 99, Nr. 3, Mar. 1, 1997, pp. 134–136, 138–14.

"Electrohydraulic Brake System—The First Approach to Brake–By–Wire Technology," Wolf–Dieter Jonner et al., *Society of Automotive Engineers, Inc.* Bd. 105, Nr. 6, 1996, pp. 1368–1375.

"A Precision Yaw Rate Sensor in Silicon Micromachining," M. Lutz et al., *Transducers*, Bd. 2, 1997, pp. 847–850.

* cited by examiner

Primary Examiner—Douglas C. Butler
(74) Attorney, Agent, or Firm—Proskauer Rose LLP

(57) ABSTRACT

Implementation of a travel dynamics control system in a vehicle is facilitated by integration of same with other operational components of an electrically controlled vehicle braking system. In an embodiment of the invention, travel dynamics electronics are integrated with the braking system electronics. In another embodiment, a yawing speed sensor and a transverse acceleration sensor are integrated with the travel dynamics electronics.

4 Claims, 5 Drawing Sheets

VEHICLE BRAKING SYSTEM

BACKGROUND OF THE INVENTION

The present invention relates to a vehicle braking system, and more particularly a brake system in which brake operation is electronically regulated in accordance with various braking criteria.

An electronically controlled vehicle braking system of this type, also referred to by the abbreviated term "EBS", is disclosed for example in European Patent Application EP 0 798 615 A1. In such EBS, initiation and desired degree of a braking action by a driver is transmitted in the form of a brake value signal to braking system electronics, which then correspondingly regulate actuation of the vehicle braking system in accordance with the driver's intentions.

In addition, the braking system electronics are often designed to ensure a directionally stable braking behavior of the vehicle, antiskid protection and uniform brake wear. For this purpose, additional signals are therefore processed by the braking system electronics, such as for example, wheel speed signals received from sensors provided as part of the braking system and/or transmitted via a vehicle data bus. It is furthermore common practice to design the braking system electronics to provide drive slip control (DSC) by controlled actuation of the braking system when the wheel speed sensors indicate a spinning tendency on at least one driven wheel.

In the disclosed EBS, yawing speed sensors, a steering angle sensor, and a transverse acceleration sensor transmit signals, in addition to the above mentioned wheel speed signals, to an electronic travel dynamics system of the vehicle braking system. The electronic travel dynamics system monitors the vehicle transverse stability in every travel state of the vehicle, determining the tendency of the vehicle to skid based upon the values of the received signals, and controls the vehicle braking system, or intervenes in its control through the braking system electronics in a manner consistently ensuring optimal transverse stability of the vehicle.

Although describing the physical principles attendant such an EBS vehicle braking system and the basic operation thereof, the above-mentioned EP publication fails to provide guidance regarding effective solutions and arrangement possibilities of the components required to realize the braking system in practice.

It is therefore the object of the present invention to propose advantageous solutions and arrangements of the components of such an EBS which may be implemented in a practical manner.

SUMMARY OF THE INVENTION

In accordance with these and other objects of the invention, there is provided a vehicle braking system in which travel dynamics electronics are integrated with other operational components of the electrically controlled vehicle braking system.

In an embodiment of the invention a vehicle braking system includes braking system electronics and travel dynamics electronics, brake actuation being controllable by the braking system, electronics at least following the indication of a brake value signal and by travel dynamics electronics on the basis of signals including wheel speed signals and signals from a steering angle sensor, a yawing speed sensor and a transverse acceleration sensor. The braking system electronics can be connected via a vehicle data bus at least to engine control electronics. In accordance with the embodiment, the travel dynamics electronics being integrated with the braking system electronics.

Another embodiment provides the integration of a yawing speed sensor and a transverse acceleration sensor with the travel dynamics electronics.

In another advantageous embodiment, the travel dynamics electronic system is connected to the vehicle data bus connecting the braking system electronics to at least the engine control electronics.

The above, and other objects, features and advantages of the present invention will become apparent from the following description read in conjunction with the accompanying drawings, in which like reference numerals designate elements having common function, and in which thick lines are used for compressed-air connections, and tinner lines for electrical control or signal conductors.

DETAILED DESCRIPTION OF THE PREFERRED EMBODIMENT

Figure 1:
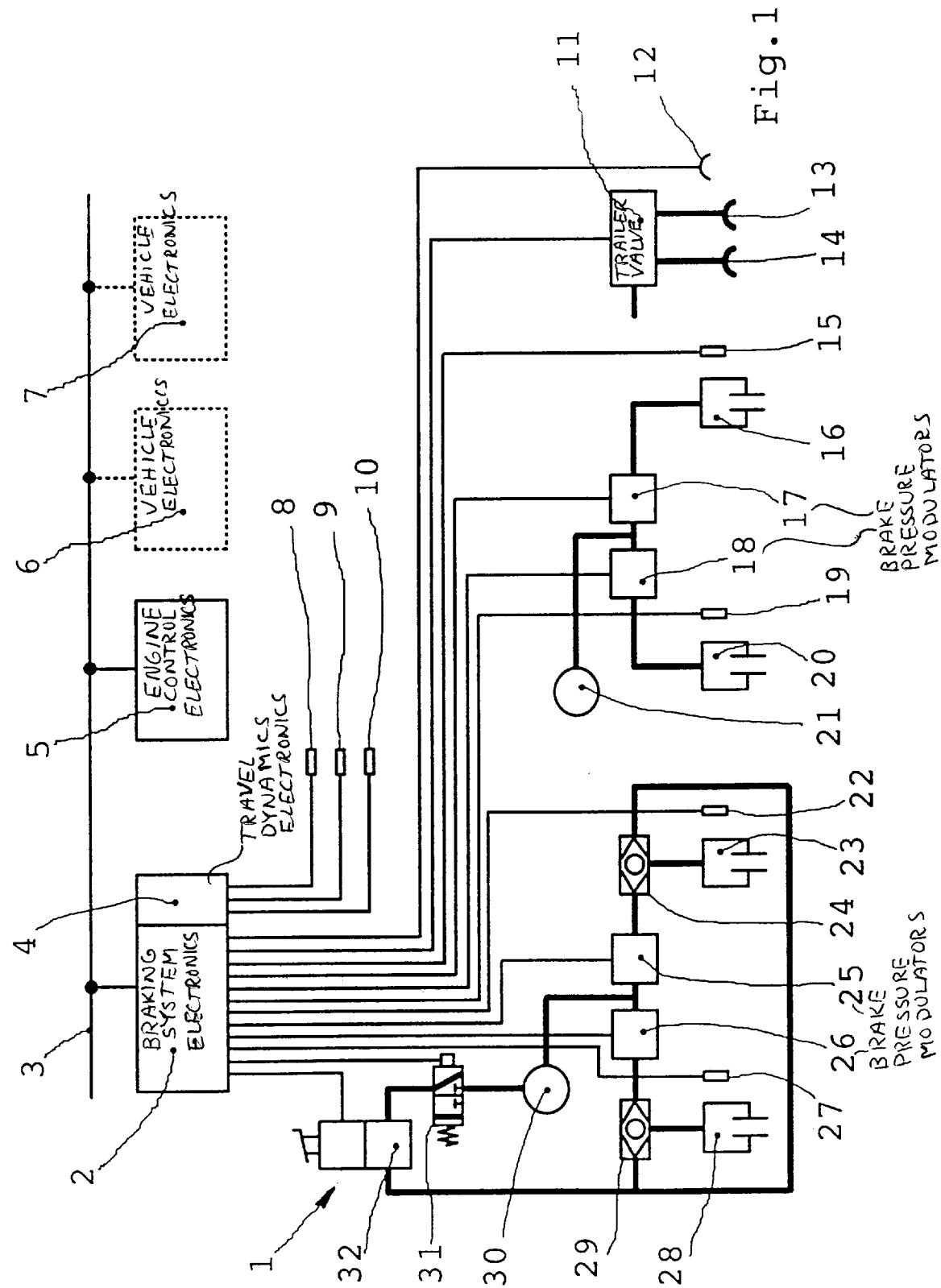
FIG. 1 is a schematic view of a vehicle braking system in accordance with an embodiment of the invention.

Referring now to the figures, and in particular FIG. 1, an electrically controlled vehicle braking system is depicted, and which is referred to hereinafter by the abbreviated designation "EBS". The EBS includes an electric brake signal transmitter 1, braking system electronics 2, compressed-air storage 21, 30, braking pressure modulators 17, 18, 25, 26, front axle brakes 23, 28 and rear axle brakes 16, 20. Depending on the particular configuration of the EBS, it may also include additional components, such as for example, braking pressure sensors, wheel speed sensors, load sensors, and wear sensors. The EBS may further process signals, such as for example load data, received via a vehicle data bus 3 from one or several electronic vehicle systems, depicted symbolically as rectangles 5, 6, 7 in FIG. 1.

In applications where the vehicle equipped with the EBS is to be used in trailer operation, the EBS is also provided with an electrically controlled trailer valve 11, compressed-air coupling heads 13, 14 and an electrical coupling 12. A trailer braking system of conventional two-line design and/or a system designed to be electrically controlled may be controlled with these devices. In the latter case, however, electric coupling 12 must be in the form of a data bus interface.

Compressed air, which is conveniently used as the actuating energy for the brakes, is supplied to the vehicle braking system in a known manner, further description of which is therefore omitted as unnecessary. A vehicle braking system of this type utilizing compressed air is disclosed for example in DE 195 10 933 A1 (U.S. Pat. No. 5,5681,992), which are incorporated herein by reference as it relates to details of construction of a pressure-producing and compressed-air transmitting vehicle installation.

The wheel brakes 16, 20, 23, 28, indicated in FIG. 1 as disk brakes, are disposed on either side of the vehicle on corresponding vehicle axles. In the event of EBS malfunction, the front axle wheel brakes 23, 28 can be actuated via upstream two-way valves 24, 29 and via a switch valve 31 by means of a pressure element 32 of the brake signal transmitter 1. The term "redundance valve" commonly refers to a valve which performs the above-intended function of the switch valve 31. Details of such an emergency braking circuit are described, for example, in DE 39 16 642 A1 (U.S. Pat. No. 5,145,239) (with reference through FIG. 5 therein), and which are incorporated herein by reference for relevant disclosure. A suitably designed emergency braking circuit of this type can also be provided for control of the rear axle wheel brakes 16, 20.

The functions providing "lock protection" and "drive slip control," referred to hereinafter respectively by the customary abbreviations "ABS" and "ASR," are integrated into the braking system electronics 2 of the depicted EBS. Wheel speed signals, which are evaluated in carrying out these as well as other functions of the EBS, are transmitted to the braking system electronics 2 by wheel speed sensors 15, 19, 22, 27. In ASR operation, the braking system electronics 2 can also transmit control signals via the vehicle data bus 3 to the engine control electronics 5. Braking pressure modulators 17, 18, 25, 26 serve also as control valves required for proper ABS and ASR operation.

A travel dynamics control system is provided which utilizes the compressed-air storage 21, 30, the wheel brakes 16, 20, 23, 28 and the wheel speed sensors 15, 19, 22, 27 already provided in the EBS, and which additionally includes travel dynamics electronics 4, a steering angle sensor 8, a yawing speed sensor 9 and a transverse acceleration sensor 10. It is the intended function of the travel dynamics control system to produce also yawing moments which stabilize the movements of the vehicle, or of the vehicle train where a trailer is used, when an unstable travel state, i.e. a skidding tendency occurring independent of brake actuation, is detected. These yawing moments are produced by targeted actuation of one or more wheel brakes of the vehicle, and/or of the trailer braking system if applicable. The travel dynamics electronics 4 can also transmit control signals to the engine control electronics 5 via the vehicle data bus 3.

Details of the operation of a travel dynamics control system are described in the aforementioned European Patent Application EP 0 798 615 A1, as well as in the special printing from the ATZ Automobiltechnische Zeitschrift 96 (1994), Vol. 11 "Das neue Fahrsicherheitssystem Electronic Stability Program of Mercedes-Benz" (The New Travel Safety System Electronic Stability Program of Mercedes-Benz), both of which are incorporated herein by reference.

In accordance with the embodiment of the invention shown in FIG. 1, the travel dynamics electronics 4 are integrated with the braking system electronics 2. The steering angle sensor 8, the yawing speed sensor 9 and the transverse acceleration sensor 10 are provided as independent components. The braking system electronics 2 are provided with additional inputs for the special sensors 8, 9, 10 of the travel dynamics control system when so integrated with the travel dynamics electronics 4.

Figure 2:
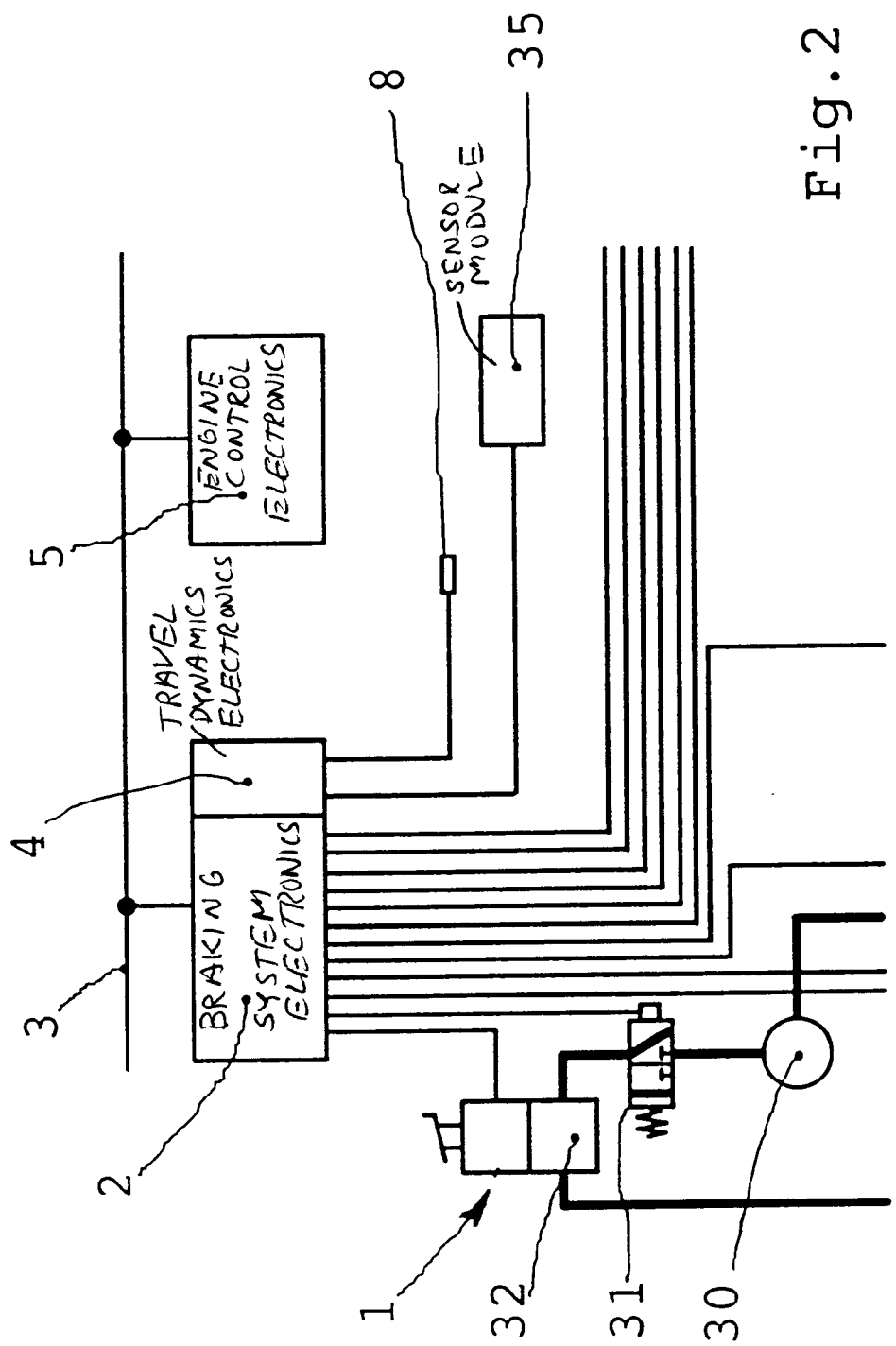
FIG. 2 is a schematic view in detail of a further embodiment of the system of FIG. 1.

Turning now to FIG. 2, a detail of a vehicle braking system is depicted in which the yawing speed sensor and the transverse acceleration sensor (referred to respectively by the reference designators 9 and 10 in FIG. 1) are combined into a sensor module 35. Both sensors can therefore be installed in a common housing. The sensor module 35 can also then utilize a shared power supply and a protective circuit that may be necessary, in a common housing. The combination of the above-mentioned sensors and their unitary configuration represent economic and space-saving solutions.

In all other respects, the vehicle braking system of FIG. 2 is the same as that of FIG. 1.

Figure 3:
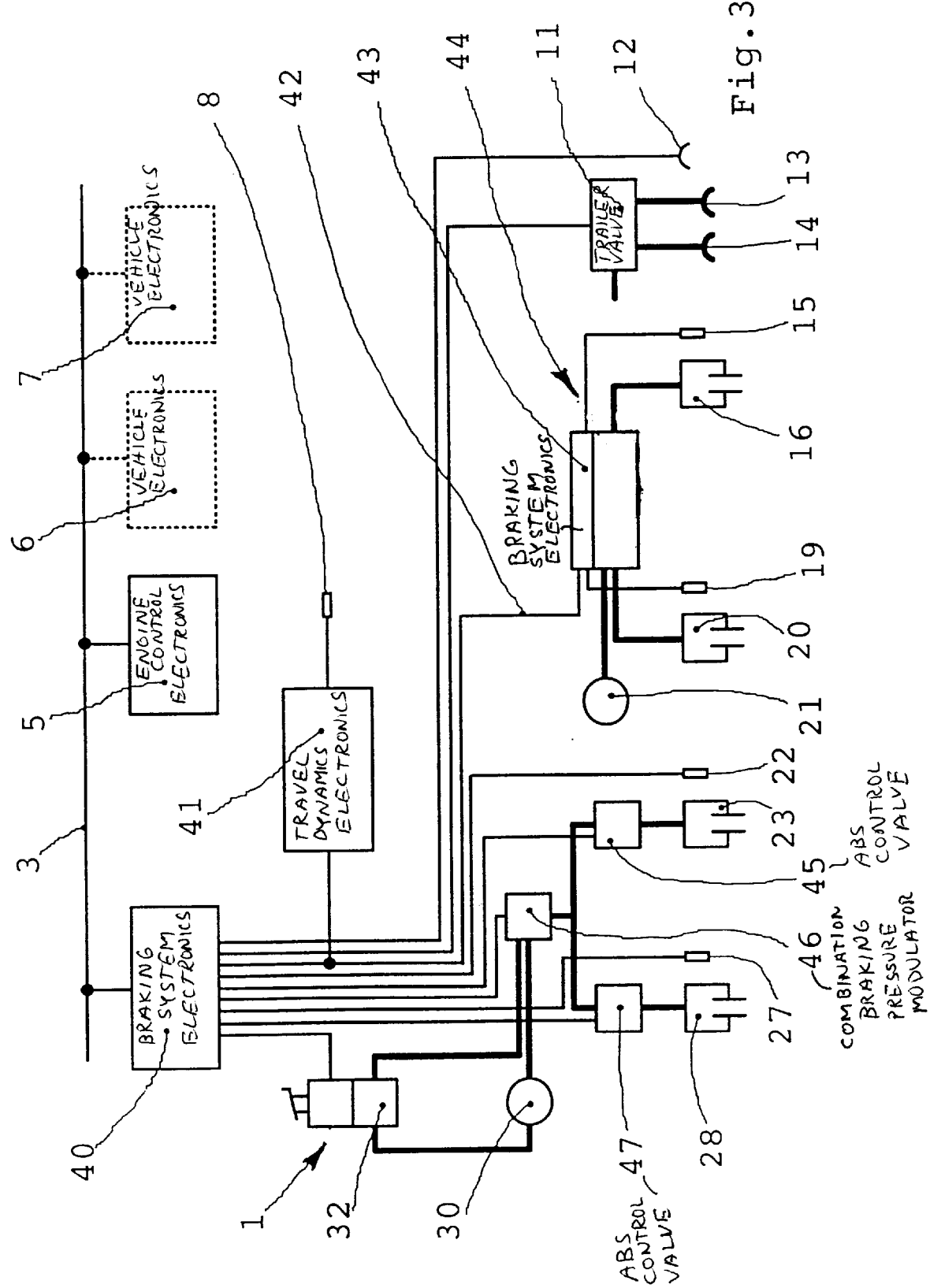
FIG. 3 is a schematic view of another embodiment of a vehicle braking system in accordance with an embodiment of the invention.

Referring now to FIG. 3, an embodiment is depicted in which the braking pressure modulators 17, 18, 25, 26 of FIG. 1 are replaced on the rear axle by an axle modulator 44, and on the front axle by a combination braking pressure modulator 46 and by ABS control valves 45, 47. In the depicted embodiment, portions of the braking system electronics designated 40, 43 are housed separately, divided between a central module 40 and an axle module 43.

The axle module 43 and the braking pressure modulators assigned to the rear axle wheel brakes 16, 20 are combined in the axle modulator 44. The axle module 43 contains a portion of the braking system electronics 40, 43, in particular such elements which are assigned to the rear axle wheel brakes 16, 20. The central module 40 and the axle module 43 are connected to each other via an EBS system bus 42. An example of such an EBS with "distributed intelligence" is described in EP 0 467 112 A2 (U.S. Pat. No. 5,255,962), and which are incorporated herein for details concerning construction and operation of such systems. It is noted, however, that in the system disclosed therein, the axle modulator is distributed between individual wheel modulators for the corresponding wheel brakes.

The combination braking pressure modulator 46 on the front axle can be controlled by the braking system electronics 40, 43 as well as by the pressure supplied by the pressure element 32 of the brake signal transmitter 1. Use of such combination braking pressure modulator and its interaction with ABS control valves are known from DE 40 16 463 A1, which is incorporated herein by reference, regarding operational and constructional details. The function performed by the combination braking pressure modulator 46 obviates the need for a redundancy valve. The function of the latter is provided by the combination braking pressure modulator 46.

In the vehicle braking system in accordance with the embodiment of FIG. 3, a travel dynamics electronic system 41 is provided as an autonomous component into which the yawing speed sensor and the transverse acceleration sensor (referred to respectively by the reference designators 9 and 10 in FIG. 1) are integrated. The steering angle sensor 8 whose area of installation is determined by its function in the area of the steering column, is connected to the travel dynamics electronic system 41. The travel dynamics electronic system 41 is on the other hand connected to the EBS system bus 42, through which it can influence the wheel brakes via operation of the braking system electronics 40, 43. In addition, travel dynamics electronic system 41 can communicate with the engine control electronics 5 via the vehicle data bus 3. When a front axle wheel brake 23 or 28 is to be actuated by the travel dynamics electronic system 41 in ASR operation, control of the combination braking pressure modulator 46 and the switching of the ABS control valve 47 or 45 assigned to the other front axle wheel brake 28 or 23 in a pressure-holding or pressure-reduction position is required.

Figure 4:
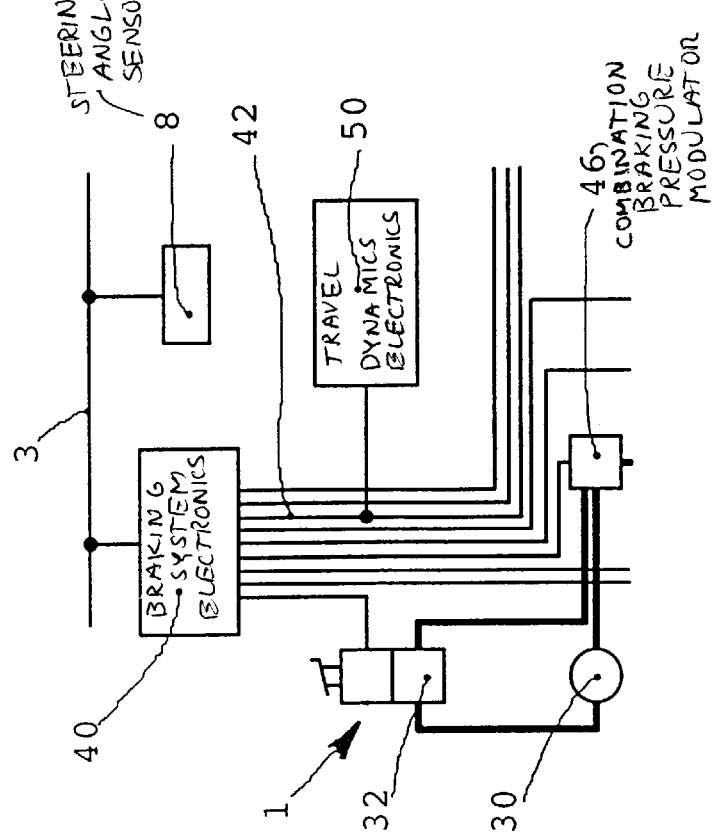
FIG. 4 is a schematic view in detail of a further embodiment of the system of FIG. 3.

Turning now to FIG. 4, a detail of a vehicle braking system in which the steering angle sensor 8 is connected to the vehicle data bus 3 is shown. In the depicted embodiment, steering angle signals are transmitted to the travel dynamics electronic system, designated in FIG. 4 by the reference number 50, via the vehicle data bus 3 and the braking system electronics 40, 43, in particular, via the central module 40 thereof. As a rule, in the present embodiment the steering angle sensor 8 will advantageously be combined into a steering angle module, which includes a circuit for signal preparation and for communication via the vehicle data bus 3.

In all other respects the vehicle braking system of FIG. 4 is the same as that of FIG.3.

Figure 5:
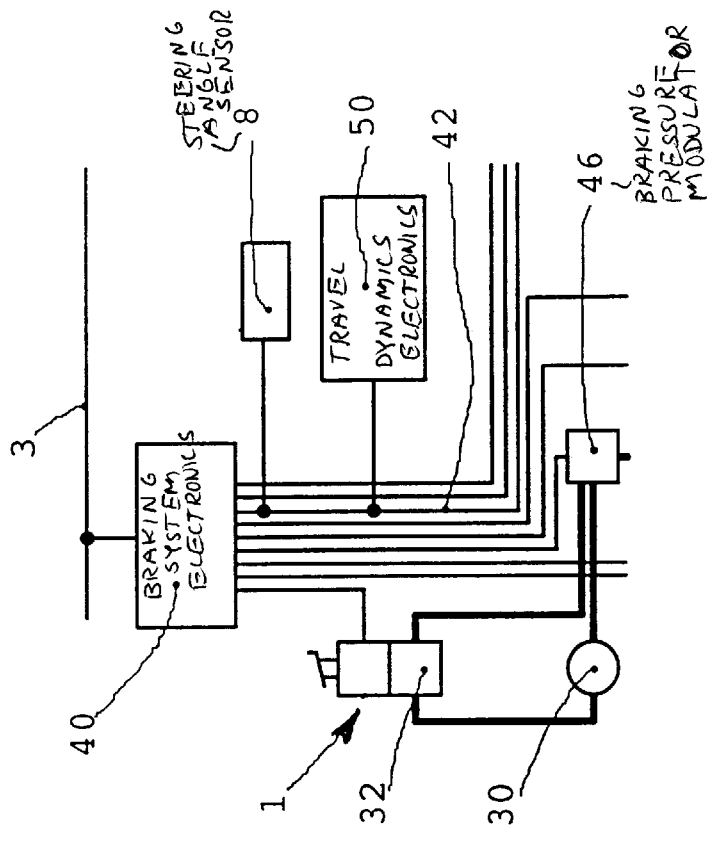
FIG. 5 is a schematic view in detail of a further embodiment a the system of FIG. 3.

Referring now to FIG. 5, an embodiment is depicted in which the steering angle sensor 8 is connected to the EBS system bus 42, rather than employing the manner of connection in FIG. 4. In all other respects, the vehicle braking system of FIG. 5 is the same as that of FIG. 4.

Figure 6:
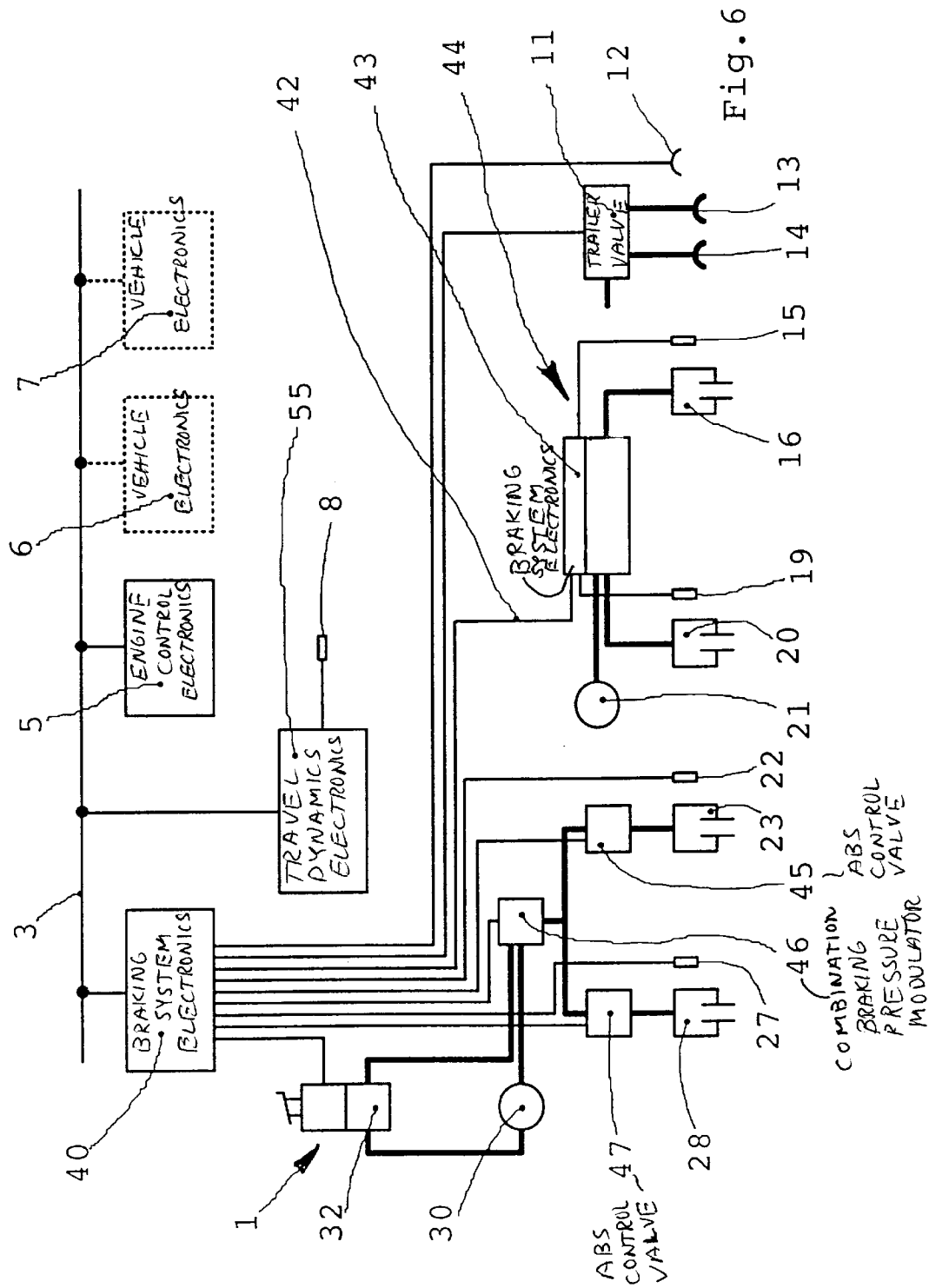
FIG. 6 is a schematic view of an additional vehicle braking system in accordance with another embodiment of the invention.

FIG. 6 shows a vehicle braking system in which the yawing speed sensor and the transverse acceleration sensor (referred to respectively by the reference designators 9 and 10 in FIG. 1) are integrated into the travel dynamics electronic system as in the embodiment of FIG. 3, which is designated by the reference number 55 in FIG. 6. The embodiment depicted in FIG. 6 differs from that of FIG. 3 in that the travel dynamics electronic system 55 is connected to the vehicle data bus 3.

In all other respects the braking system of FIG. 6 is the same as the one described with reference to FIG. 3.

The embodiments of FIGS. 3, 4, 5 and 6 make it possible to expand an existing mass-produced EBS by a travel dynamics electronic system in an economical and space-saving manner, entirely without or with minimal intrusion into the braking system electronics.

In accordance with all embodiments of the invention, other various provided vehicle electronics in addition to the engine control electronics 5 can also be supplied with data of the travel dynamics control system via the vehicle data bus 3 and, the travel dynamics electronics may obtain data of other vehicle electronics, for example rolling angle data, to optimize stability control of the vehicle.

The person schooled in the art will recognize that the explanations given above concerning a particular embodiment or design also apply to other embodiments or designs directly or as suitably adapted insofar as the explanations are not contradictory to such embodiments or designs.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle braking system, comprising:

braking system electronics and travel dynamics which are separated from each other;

brake actuation being controlled by said braking system electronics at least following the indication of a brake value signal and/or by said travel dynamics electronics on the basis of signals including wheel speed signals and signals from a steering angle sensor, a yawing speed sensor and a transverse acceleration sensor;

portions of the braking system electronics being housed separately, divided between a central module and an axle module;

the central module and the axle module of the braking system electronics are connected via a system data bus; and the braking system electronics being connected via a vehicle data bus at least to an engine control electronics; wherein the travel dynamics electronics is connected to the system data bus and the yawing speed sensor and the transverse acceleration sensor being integrated with the travel dynamics electronics.

2. A vehicle braking system according to claim 1, wherein the steering angle sensor is connected to the system data bus of said braking system electronics.

3. A vehicle braking system according to claim 1, wherein the steering angle sensor is connected to the vehicle data bus.

4. A vehicle braking system according to claim 1, wherein the steering angle sensor is connected to the travel dynamics electronics.

* * * * *